US010237151B2

(12) United States Patent
Baldi et al.

(10) Patent No.: US 10,237,151 B2
(45) Date of Patent: *Mar. 19, 2019

(54) ATTRIBUTING NETWORK ADDRESS TRANSLATION DEVICE PROCESSED TRAFFIC TO INDIVIDUAL HOSTS

(71) Applicant: Narus, Inc., Sunnyvale, CA (US)

(72) Inventors: Mario Baldi, Cuneo (IT); Yong Liao, Sunnyvale, CA (US); Amedeo Sapio, Casapulla (IT)

(73) Assignee: Narus, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,481

(22) Filed: Sep. 1, 2017

(65) Prior Publication Data
US 2018/0013645 A1   Jan. 11, 2018

Related U.S. Application Data

(63) Continuation of application No. 14/294,946, filed on Jun. 3, 2014, now Pat. No. 9,769,038.

(51) Int. Cl.
G06F 15/173 (2006.01)
H04L 12/26 (2006.01)
H04L 29/12 (2006.01)

(52) U.S. Cl.
CPC .......... *H04L 43/08* (2013.01); *H04L 43/026* (2013.01); *H04L 43/12* (2013.01); *H04L 61/2514* (2013.01); *H04L 61/2517* (2013.01)

(58) Field of Classification Search
CPC ............................ H04L 12/56; H04L 43/065
See application file for complete search history.

(56) References Cited

U.S. PATENT DOCUMENTS

| 8,848,554 | B2 | 9/2014 | Reed |
| 9,769,038 | B1 * | 9/2017 | Baldi .................... H04L 43/026 |
| 2006/0092931 | A1 | 5/2006 | Walter et al. |
| 2006/0209822 | A1 | 9/2006 | Hamamoto et al. |
| 2011/0191467 | A1 | 8/2011 | Imbimbo et al. |
| 2018/0013646 | A1 * | 1/2018 | Baldi ..................... H04L 43/08 |

OTHER PUBLICATIONS

"U.S. Appl. No. 14/294,946, Examiner Interview Summary dated Apr. 8, 2016", 3 pages.

(Continued)

*Primary Examiner* — John B Walsh
(74) *Attorney, Agent, or Firm* — Kwan & Olynick LLP

(57) ABSTRACT

A method for profiling network traffic. The method includes capturing, from the network traffic using a packet capturing device, a plurality of packets, identifying a first portion of the plurality of packets as a first flow based at least on a common Internet Protocol (IP) address assigned to each packet of the first flow by a network address translation (NAT) device, extracting, by a hardware processor separate from the NAT device and based on an NAT profile of the NAT device, a first data item from the first flow, wherein the first data item is inserted into the first flow by the NAT device for identifying a first host device coupled to the NAT device, and determining, by the hardware processor based on the first data item, that the first flow is generated by the first host device.

20 Claims, 7 Drawing Sheets

(56) References Cited

OTHER PUBLICATIONS

"U.S. Appl. No. 14/294,946, Final Office Action dated Jul. 19, 2016", 18 pages.
"U.S. Appl. No. 14/294,946, Non Final Office Action dated Dec. 31, 2015", 17 pages.
"U.S. Appl. No. 14/294,946, Notice of Allowance dated May 22, 2017", 7 pages.
Bush, R , "The Address plus Port (A+P) Approach to the IPv4 Address Shortage", Internet Engineering Task Force, Internet Initiative, Japan, Aug. 1, 2011.
Srisuresh, P et al., "IP Network Address Translator (NAT) Terminology and Considerations", The Internet Society 1999, Aug. 1, 1999, 31 pages.
"U.S. Appl. No. 15/694,484, Non Final Office Action dated Mar. 5, 2018", 7 pages.

* cited by examiner

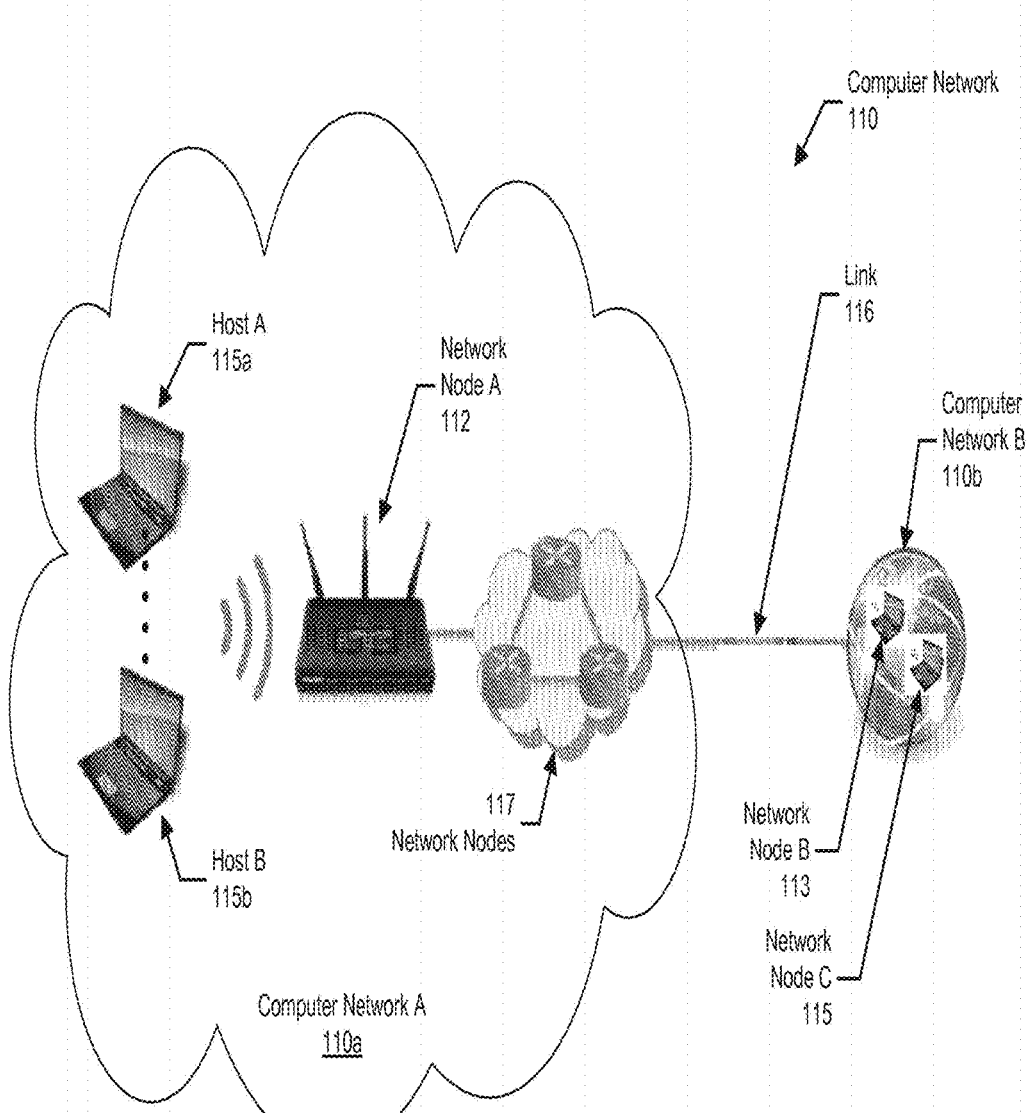
FIG. 3.1

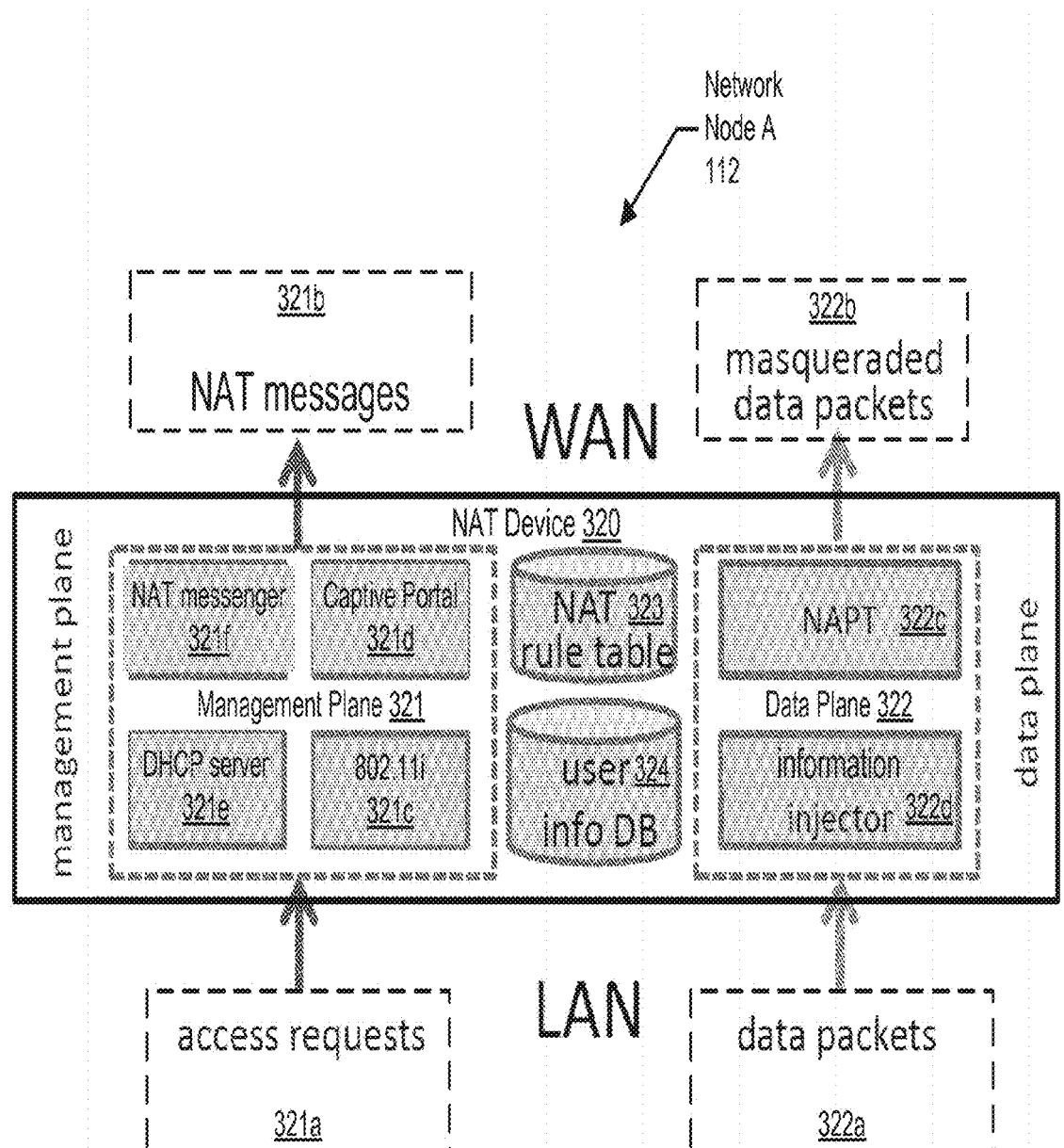
FIG. 3.2

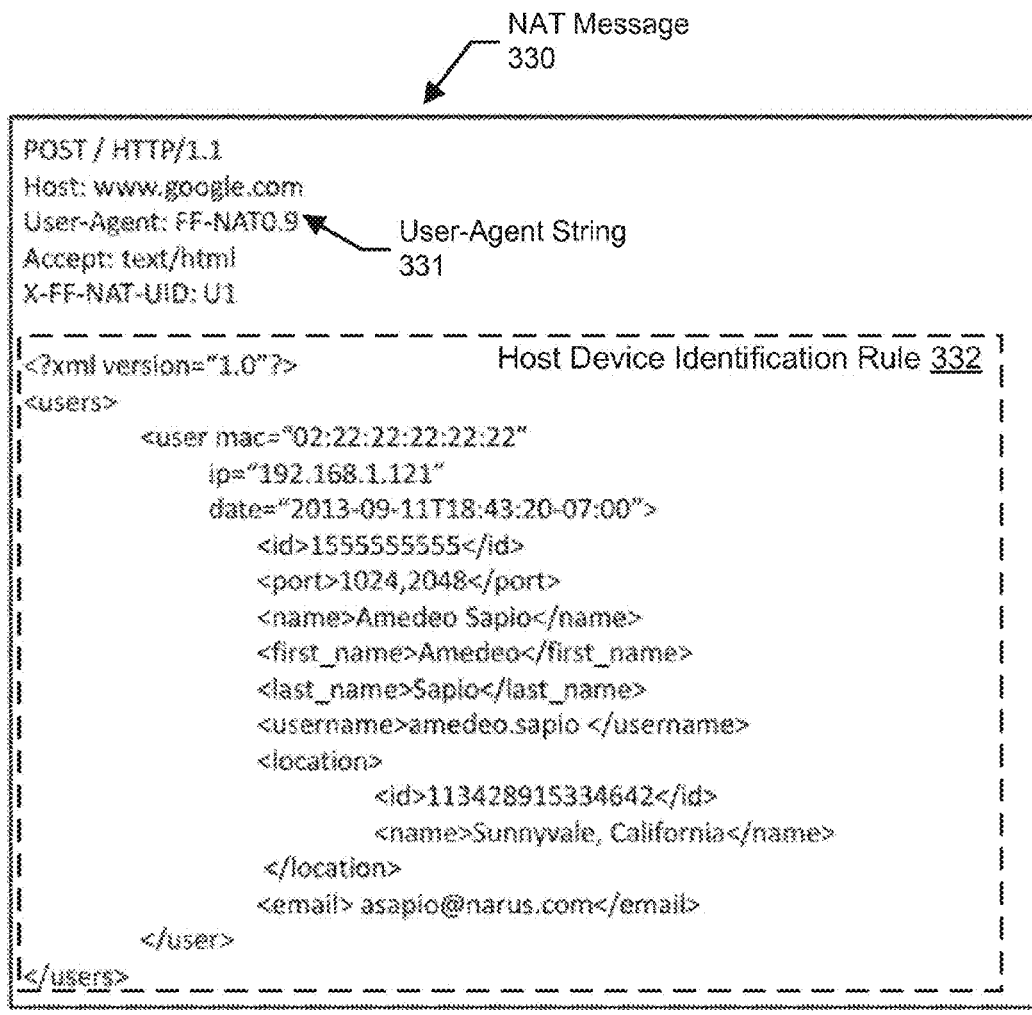
FIG. 3.3

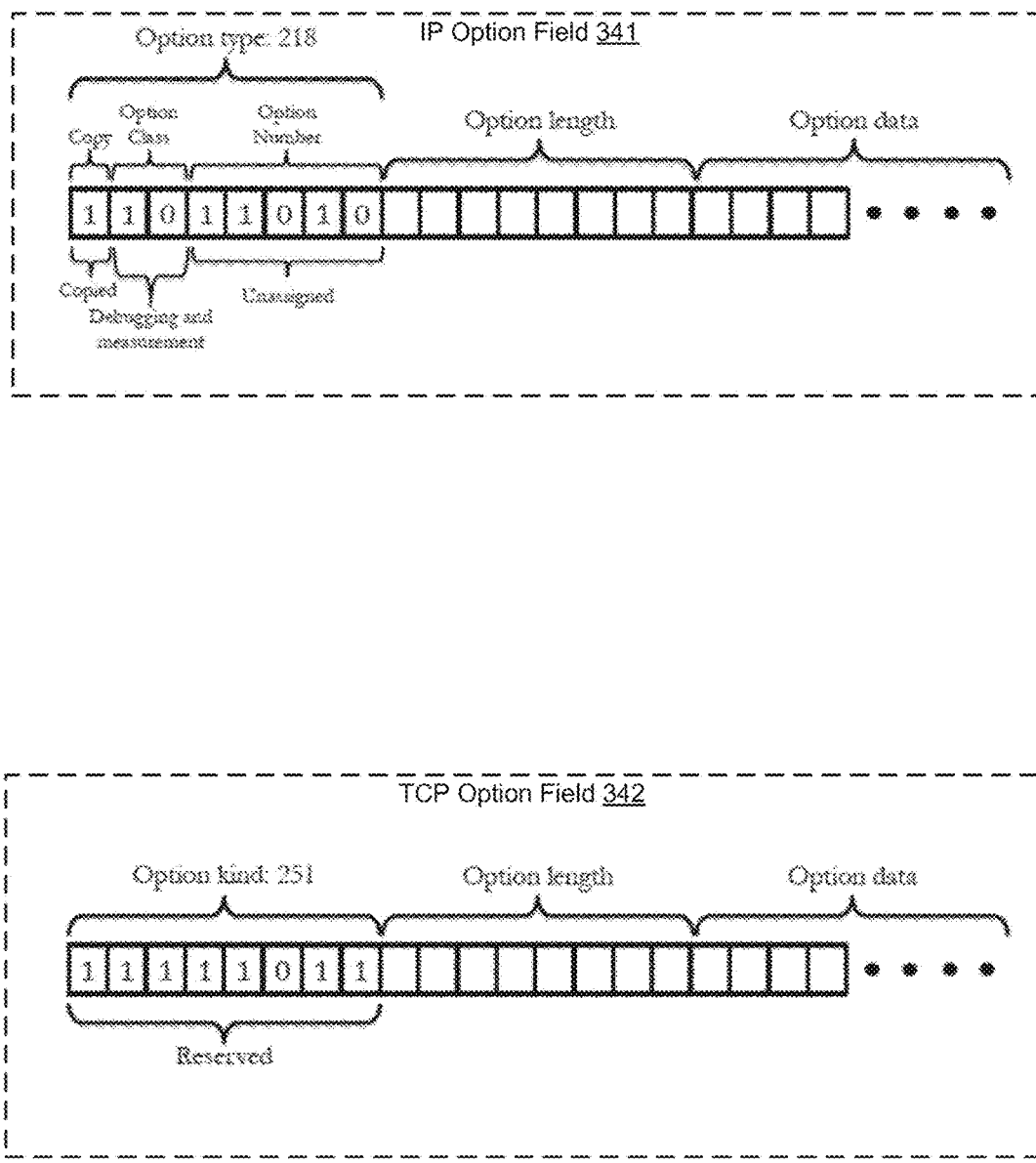
FIG. 3.4

ATTRIBUTING NETWORK ADDRESS TRANSLATION DEVICE PROCESSED TRAFFIC TO INDIVIDUAL HOSTS

CROSS-REFERENCE TO RELATED APPLICATIONS

This application is a continuation of and claims benefit of priority under 35 U.S.C. § 120 to U.S. application Ser. No. 14/294,946, entitled "ATTRIBUTING NETWORK ADDRESS TRANSLATION DEVICE PROCESSED TRAFFIC TO INDIVIDUAL HOSTS," filed on Jun. 3, 2014, which is incorporated herein by reference in its entirety.

BACKGROUND OF THE INVENTION

Network Address Translation (NAT) is the process of modifying IP address information in network traffic (e.g., IPv4 traffic) headers while in transit across a traffic routing device. The traffic routing device that performs the IP address modification is referred to as an NAT device. NAT became a popular tool for alleviating the consequences of IPv4 address exhaustion. It has become a common feature in routers for home and small-office Internet connections. NAT device hides an entire IP address space, usually consisting of private IP addresses, behind a single IP address in another (usually public) address space. For example, the single IP address belongs to the NAT device in the public address space and is assigned to all packets in a flow originated from a host device hidden from the public address space behind the NAT device. In other words, the single IP address replaces the host device's private IP addresses and is common across all packets in the flow modified by the NAT device. To avoid ambiguity in the handling of returned packets, an one-to-many NAT device uses higher level information, such as TCP/UDP ports in outgoing packets, possibly altering it when required to avoid ambiguity, and maintains a translation table so that return packets can be correctly translated back. However, such higher level information and translation table is not available outside of the NAT device.

SUMMARY

In general, in one aspect, the present invention relates to a method for profiling network traffic. The method includes capturing, from the network traffic using a packet capturing device, a plurality of packets, identifying a first portion of the plurality of packets as a first flow based at least on a common Internet Protocol (IP) address assigned to each packet of the first flow by a network address translation (NAT) device, extracting, by a hardware processor separate from the NAT device and based on an NAT profile of the NAT device, a first data item from the first flow, wherein the first data item is inserted into the first flow by the NAT device for identifying a first host device coupled to the NAT device, and determining, by the hardware processor based on the first data item, that the first flow is generated by the first host device.

In general, in one aspect, the present invention relates to a system for profiling network traffic. The system includes a network address translation (NAT) device configured to translate Internet Protocol (IP) addresses and port numbers for host devices coupled to the NAT device, a first host device and a second host device coupled to the NAT device, a hardware processor separate from the NAT device, and memory comprising instructions executable by the processor, wherein the instructions comprise an acquisition module configured to obtain a plurality of packets captured from the network traffic, and identify a first portion of the plurality of packets as a first flow based at least on a common IP address assigned to each packet of the first flow by the NAT device, and a host analyzer configured to extract, based on an NAT profile of the NAT device, a first data item from the first flow, wherein the first data item is inserted into the first flow by the NAT device for identifying a first host device coupled to the NAT device, and determine, based on the first data item, that the first flow is generated by the first host device.

In general, in one aspect, the present invention relates to a computer readable medium storing instructions, when executed by the computer to profile network traffic. The instructions include functionality for capturing, from the network traffic using a packet capturing device, a plurality of packets, identifying a first portion of the plurality of packets as a first flow based at least on a common Internet Protocol (IP) address assigned to each packet of the first flow by a network address translation (NAT) device, wherein the NAT device is separate from the processor, extracting, based on an NAT profile of the NAT device, a first data item from the first flow, wherein the first data item is inserted into the first flow by the NAT device for identifying a first host device coupled to the NAT device, and determining, based on the first data item, that the first flow is generated by the first host device.

Other aspects and advantages of the invention will be apparent from the following description and the appended claims.

BRIEF DESCRIPTION OF DRAWINGS

FIGS. 3.1-3.4 show various examples according to aspects of the invention.

DETAILED DESCRIPTION

Figure 1:
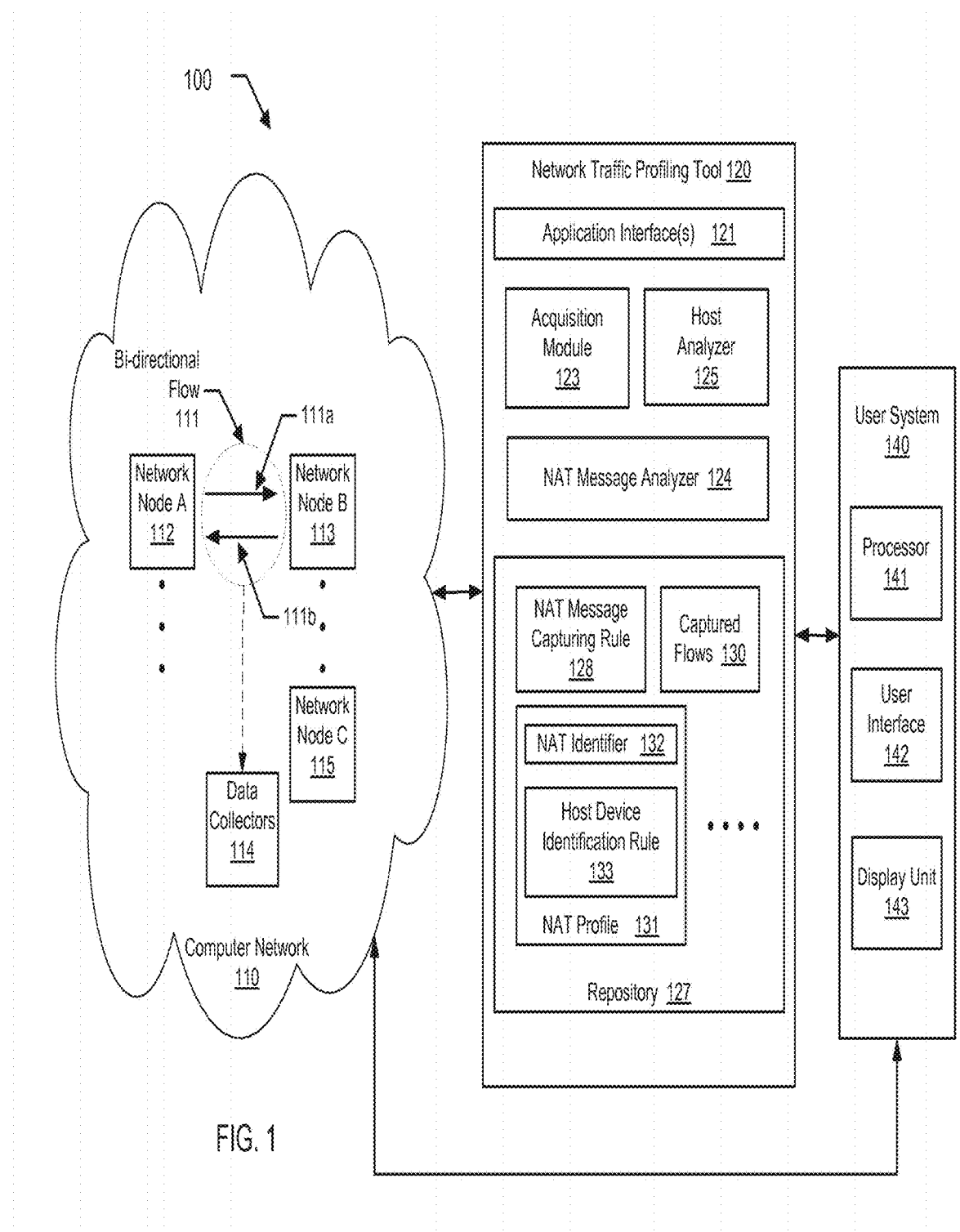
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints of the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts. Throughout this disclosure, a host is also referred to as a host device, which contains a hardware component.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP (i.e., transmission control protocol), UDP (i.e., user datagram protocol), etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

Embodiments of the invention provide a method and system to attribute network traffic to individual host devices behind a Network Address Translation (NAT) device. In one or more embodiments of the invention, the system includes a network traffic profiling tool operating in conjunction with the NAT device to attribute the network traffic to individual host devices. In particular, the NAT device communicates information regarding the performed translation to the network traffic profiling tool. Accordingly, the network traffic profiling tool extracts and processes the information from the NAT device to classify the network traffic coming from the NAT device on per-user or per-host basis. Generally, multiple host devices sharing the same source IP address renders it difficult to identify the true origin of each packet, which presents a serious issue for network forensics in identifying a malicious user/device that has generated suspicious network traffic behind the NAT device. In one or more embodiments of the invention, the network traffic profiling tool is used to facilitate the network forensics and is referred to as a network forensics backend.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic profiling tool (120), a user system (140), and a computer network (110). The network traffic profiling tool (120) includes a data repository (127), one or more application interface(s) (121), an acquisition module (123), an NAT message analyzer (124), and a host analyzer (125). The user system (140) includes a processor (141), a user interface (142), and a display unit (143). The computer network (110) may include wired and/or wireless portions of the Internet and/or other data communications networks such as wide area networks (WANs), local area networks (LANs), enterprise computing networks, etc. Further, the computer network (110) includes network nodes (e.g., network node A (112), network node B (113), network node C (115), data collectors (114), etc.), which are devices configured with computing and communication capabilities for executing applications in the network (110). Certain device(s) (e.g., data collectors (114)) within the computer network (110) may be configured to collect network data (e.g., bi-directional flow (111)) for providing to the network traffic profiling tool (120). In one or more embodiments, the data collectors (114) are referred to as packet capturing devices. Each of these components depicted in FIG. 1 is described below. One of ordinary skill in the art will appreciate that embodiments are not limited to the configuration shown in FIG. 1.

As shown in FIG. 1, the network node A (112) and network node B (113) communicate with each other by exchanging data packets forming a bi-directional flow (111), which includes two uni-directional flows (111a) and (111b) represented by two arrows. In one or more embodiments of the invention, the network node A (112) and the network node B (113) exchange data packets in the bi-directional flow (111) as a result of an application executing on the network node A (112) and the network node B (113). In this context, the bi-directional flow (111) is referred to as being generated by the application executing on the network node A (112) and network node B (113). For example, the network node A (112) may act as a server while the source IP address in the 5-tuple of the uni-directional flow (111a) and the destination IP address in the 5-tuple of the unit-direction flow (111b) are both the IP address of the network node A (112), referred to as the server IP address. In addition, the network node B (113) may act as a client while the destination IP address in the 5-tuple of the uni-directional flow (111a) and the source IP address in the 5-tuple of the unit-direction flow (111b) are both the IP address of the network node B (113), referred to as the client IP address. In this example, the source port in the 5-tuple of the uni-directional flow (111a) and the destination port in the 5-tuple of the unit-direction flow (111b) are both the port of the network node A (112), referred to as the server port. In addition, the destination port in the 5-tuple of the uni-directional flow (111a) and the source port in the 5-tuple of the unit-direction flow (111b) are both the port of the network node B (113), referred to as the client port. Further, the server port and the transport protocol in both 5-tuples are characteristics of the application executing on the network node A (112) and the network node B (113).

In one or more embodiments of the invention, certain device(s) (e.g., network node A (112)) within the computer network (110) may be configured as an NAT device. In one or more embodiments, an NAT device includes hardware and software components that allow multiple host devices to share the same source IP address when communicating to the global Internet. This is achieved by exploiting the identification criteria used by the upper levels of the TCP/IP stack (i.e. TCP and UDP ports). Before an outgoing packet from a host device is forwarded by an NAT device, the source IP address and port number of the outgoing packet are modified by the NAT device. In the meantime, the NAT device maintains the mapping between the modified source IP address and port number to the original source IP address and port number. In this way, the NAT device may correctly modify the destination IP address and port number of any incoming packets, so as to correctly direct the incoming packets to the host devices behind the NAT device. An example of the NAT device and associated host devices in the computer network (110) is described in reference to FIG. 3.1 below.

FIG. 3.1 shows additional details of the compute network (110) in an example scenario. As shown in the example depicted in FIG. 3.1, the computer network (110) includes two networks (i.e., computer network A (110a) and computer network B (110b)) coupled by a link (116). In one or more embodiments, each of the computer network A (110a) and computer network B (110b) may include wired and/or wireless portions of the Internet and/or other data communications networks such as wide area networks (WANs), local area networks (LANs), enterprise computing network, etc. In particular, the computer network A (110a) and computer network B (110b) include the network node A (112) and network node B (113), respectively, as depicted in FIG. 1 above. In one or more embodiments, the network node A (112) is an NAT device that translates the private IP addresses and port numbers of packets originated from the associated host devices (e.g., host A (115a), host B (115b)). In this context, the host A (115a) and host B (115b) are referred to as host devices associated with the NAT device (i.e., network node A (112)) and/or host devices behind the NAT device (i.e., network node A (112)). In addition, FIG. 3.1 shows additional network nodes, such as the network nodes (117) within the computer network A (110a) and network node C (115) within the computer network B (110b).

In one or more embodiments, the computer network A (110a) is a local area network of a business office or a wide area network of an Internet service provider (ISP), and the computer network B (110b) is the Internet. In such embodiments, the NAT device (i.e., network node A (112)) is the gateway for multiple host devices (e.g., host A (115a), host B (115b)) to access the Internet (i.e., computer network B (110b)). In particular, the NAT device (i.e., network node A (112)) provides IP address and port number translation service to these multiple host devices. For example, the host A (115a) and host B (115b) may connect to the NAT device (i.e., network node A (112)) via wireless or wired connections. In one or more embodiments, a network forensic backend coupled to the link (116) may be used to monitor/analyze the network traffic from/to one or more NAT devices, such as the network node A (112). For example, the network forensic backend may include the network profiling tool (120) that monitors/analyzes the bi-directional flow (111) in conjunction with the data collectors (114) shown in FIG. 1 above. Specifically, the data collectors (114) sniff the link (116) depicted in FIG. 3.1 to capture the bi-directional flow (111) exchanged between the network node A (112) within the computer network A (110a) and the network node B (113) within the computer network B (110b). Because the network node A (112) is the NAT device, the bi-directional flow (111) may be originated from and destined to a host device behind the NAT device, such as the host A (115a) or host B (115b). In this context, the uni-directional flow (111a) is referred to as the outgoing flow from the host device via the NAT device and the uni-directional flow (111b) is referred to as the incoming flow (or return flow) returning to the host device via the NAT device. In one or more embodiments, the network forensic backend, in particular the network profiling tool (120) determines which of the host A (115a) and host B (115b) is the host device that sends/receives the bi-directional flow (111) behind the NAT device (i.e., network node A (112)).

In one or more embodiments, the network forensic backend or the network profiling tool (120) may be physically and/or logically far way from the monitored NAT devices (e.g., network node A (112)). For example, the link (116) where the monitored network traffic is captured and the network node A (112) may be multiple hops away across the network nodes (117). In one or more embodiments, the network forensic backend or the network profiling tool (120) obtains pre-determined rules (referred to as host device identification rules) provided by the NAT device to identify host devices behind the NAT device. Accordingly, the network forensic backend or the network profiling tool (120) attributes packets in the monitored network traffic to individual host devices behind the NAT device according to these pre-determined rules.

In one or more embodiments, the network node A (112) includes two core building blocks to perform the functionality of the NAT device and cooperatively perform network traffic attribution with the network forensic backend or the network profiling tool (120). Specifically, the network node A (112) includes a data packet masquerading module (not shown) to modify packets in various ways to facilitate the network forensic backend or the network profiling tool (120) to correctly attribute network traffic. In addition, the network node A (112) includes communication module (not shown) to send pre-determined host device identification rules to the network forensic backend or the network profiling tool (120). In one or more embodiments, these host device identification rules are sent in an NAT message to a predetermined network node (e.g., network node C (115)) that is within the computer network B (110b) and separate from the network forensic backend or the network profiling tool (120). In one or more embodiments, the NAT message is sent by the NAT device on a periodic basis (e.g., hourly, daily, weekly, etc.) or based on an event of the NAT device such as a connection status update of host devices behind the NAT device. In one or more embodiments, the NAT message is captured by the network forensic backend or the network profiling tool (120) according to an NAT message capturing rule to retrieve the host device identification rules for identifying host devices behind the NAT device.

In one or more embodiments, the data packet masquerading module (not shown) of the network node A (112) masquerades data packets (i.e., translates source address/source port of outgoing data packets, and modifies the destination address/destination port of incoming packets) to direct packets to the correct host devices behind the NAT device. In addition, the data packet masquerading module (not shown) of the network node A (112) also masquerades data packets differently for different host devices behind the NAT device, in order to facilitate the network forensic backend or the network profiling tool (120) to differentiate network traffic from multiple host devices behind an FF-NAT device. Additional details of data packet masquerading performed by the NAT device (e.g., network node A (112)), as well as sending and capturing the NAT message are described in reference to the method flowchart depicted in FIG. 2 and the examples depicted in FIGS. 3.2-3.4 below.

Returning to the discussion of FIG. 1, in one or more embodiments of the invention, the network traffic profiling tool (120) is configured to interact with the computer network (110) using one or more of the application interface(s) (121). The application interface(s) (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface(s) (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that capture and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface(s) (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic profiling tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the network traffic profiling tool (120). The analyst user may include, but is not limited to, an individual, a group, an organization, or some other entity having authority and/or responsibility to access the network traffic profiling tool (120). Specifically, the context of the term "analyst user" here is distinct from that of a user of the computer network (110). The user system (140) may be, or may contain a form of, an internet-based communication device that is capable of communicating with the application interface(s) (121) of the network traffic profiling tool (120). Alternatively, the network traffic profiling tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic profiling tool (120) (e.g., report, alert, etc.).

As shown, communication links are provided between the network traffic profiling tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic profiling tool (120), the user system (140), and the communication links may be part of the computer network (110).

In one or more embodiments, a central processing unit (CPU, not shown) of the network traffic profiling tool (120) is configured to execute instructions to operate the components of the network traffic profiling tool (120). In one or more embodiments, the memory (not shown) of the network traffic profiling tool (120) is configured to store software instructions for analyzing the network trace to attribute NAT device transmitted network traffic to individual host devices that originate the network traffic. The memory may be one of a variety of memory devices, including but not limited to random access memory (RAM), read-only memory (ROM), cache memory, and flash memory. The memory may be further configured to serve as back-up storage for information stored in the data repository (127).

The network traffic profiling tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic profiling tool (120) is configured to obtain and store data in the data repository (127). In one or more embodiments, the data repository (127) is a persistent storage device (or set of devices) and is configured to receive data from the computer network (110) using the application interface(s) (121). The data repository (127) is also configured to deliver working data to, and receive working data from, the acquisition module (123), NAT message analyzer (124), and host analyzer (125). The data repository (127) may be a data store (e.g., a database, a file system, one or more data structures configured in a memory, some other medium for storing data, or any suitable combination thereof), which may include information (e.g., NAT message capturing rule (128), captured flows (130), NAT profile (131), etc.) related to the network traffic profiling. The data repository (127) may be a device internal to the network traffic profiling tool (120). Alternatively, the data repository (127) may be an external storage device operatively connected to the network traffic profiling tool (120).

In one or more embodiments, the network traffic profiling tool (120) is configured to interact with the user system (140) using the application interface(s) (121). The application interface(s) (121) may be configured to receive data and/or instruction(s) from the user system (140). The application interface(s) (121) may also be configured to deliver information and/or instruction(s) to the user system (140). In one or more embodiments, the network traffic profiling tool (120) is configured to support various data formats provided by the user system (140).

In one or more embodiments, the network traffic profiling tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as captured flows (130). In particular, the captured flows (130) may include information representing the bi-directional flow (111) that is captured from the link (116) shown in FIG. 3.1.

In one or more embodiments, the acquisition module (123) in conjunction with the data collectors (114) forms a flow parser that reconstructs (e.g., eliminates redundant packets, collates packets into correct order, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments, the network traffic profiling tool (120) includes the NAT message analyzer (124) that is configured to capture the NAT message sent from the NAT device (e.g., network node A (112)). Specifically, the NAT message is captured according to the NAT message capturing rule (128). In one or more embodiments, the NAT message capturing rule (128) is a pre-determined rule commonly followed by both the NAT device (e.g., network node A (112)) and the network traffic profiling tool (120). For example, the NAT message capturing rule (128) may specify that the NAT message is to be sent to a pre-determined network device (e.g., network node C (115)) such that the network traffic profiling tool (120), or other data capturing device in communication with the network traffic profiling tool (120) may capture the NAT message. An example of the NAT message capturing rule (128) is described in reference to the method flowchart depicted in FIG. 2 and an example NAT message depicted in FIG. 3.3 below.

In one or more embodiments, an NAT profile is embedded in the NAT message by the NAT device (e.g., network node A (112)). Specifically, the NAT profile includes an identifier of the NAT device and a pre-determined host device identification rule to identify host devices behind the NAT device. In response to capturing the NAT message, the NAT message analyzer (124) extracts the embedded NAT profile from the NAT message. In one or more embodiments, the extracted NAT profile is stored in the repository (127), e.g., as the NAT profile (131). For example, the NAT profile (131) pertains to the network node A (112) and includes the NAT identifier (132) identifying the network node A (112) as well as the host device identification rule (133) for identifying host devices behind the network node A (112). In one or more embodiments, the NAT identifier (132) is the IP address of the network node A (112).

In one or more embodiments, the network traffic profiling tool (120) includes the host analyzer (125) that is configured to extract necessary information from a captured traffic flow to determine that the captured traffic flow is originated from a particular host device behind an NAT device. For example, the captured flow may be the uni-directional flow (111a) whose source IP address identifies the network node A (112) and matches the NAT identifier (132). Accordingly, the host analyzer (125) looks up the host device identifying rule (133) from the corresponding NAT profile (131) of the network node A (112). In one or more embodiments, the host device identifying rule (133) specifies that a particular data item inserted into the uni-directional flow (111a) by the NAT device (i.e., network node A (112)) is to be used for identifying the host device behind the NAT device (i.e., network node A (112)) that originated the uni-directional flow (111a). For example, the inserted data item may be the port number assigned by the NAT device or a particular header field containing host device identifying information embedded by the NAT device. Additional details of host device identifying information and attributing the captured traffic flow using the host device identifying information are described in reference to the method flowchart depicted in FIG. 2 and the examples depicted in FIGS. 3.2-3.4 below.

Although only one NAT profile of a single NAT device and one monitored traffic flow are described above, multiple NAT profiles of multiple NAT devices and multiple traffic flows may exist in the system (100) and function in a similar manner as described above.

Figure 2:
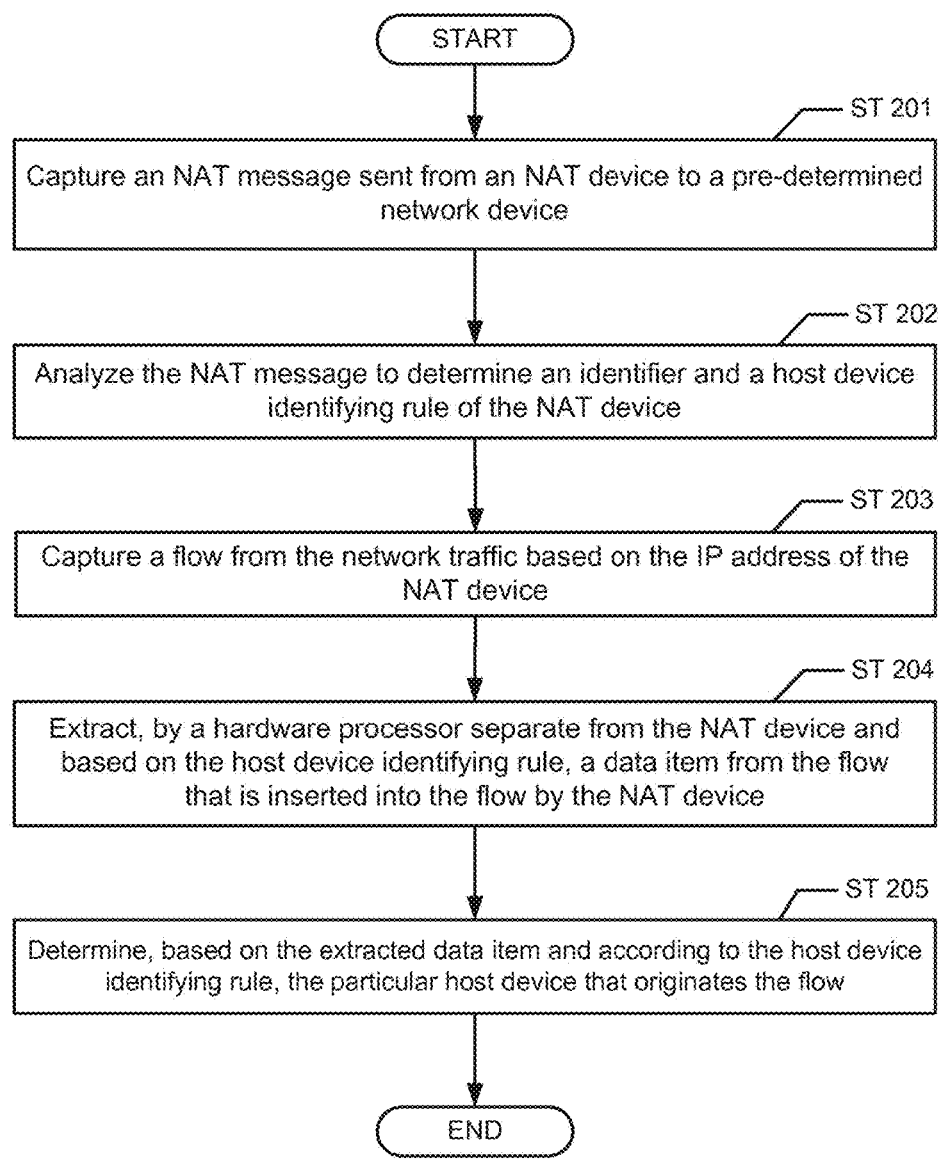
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, an NAT message sent from the NAT device to a pre-determined network device is captured. In one or more embodiments, the NAT message is captured by a network traffic profiling tool that is separate from the pre-determined network device. For example, the network traffic profiling tool may be a network forensic backend while the pre-determined network device may be a web server. In one or more embodiment, an NAT profile is embedded in the NAT message by the NAT device to identify the NAT device and specify a host device identifying rule. In particular, the host device identifying rule allows the NAT device and the network traffic profiling tool to coordinate with each other to correctly attribute network traffic to host devices behind the NAT device. The type of coordination depends on both the desired granularity of traffic attribution by the network traffic profiling tool and how data packets are masqueraded by the NAT device. In addition to the IP address/port number translation applied to all packets of a flow, the NAT device may insert additional host device identification information into packets of the flow. Certain mechanisms, such as using specific source port ranges and IP DSCP (Differentiated Service Code Point) values, do not have enough capacity to encode sufficient information into the packets. Therefore, the NAT message is sent as a dedicated signaling message by the NAT device.

In one or more embodiments, the NAT message is sent directly to network traffic profiling tool. In one or more embodiments, the NAT message is sent to a separate network device and captured by the network traffic profiling tool. For example, the NAT message may be sent as an HTTP message to a widely available web service. The HTTP message is constructed in such a way that the network traffic profiling tool is able to identify and capture the HTTP message as the NAT message. For example, the HTTP message may contain a pre-determined User-Agent string that allows the network traffic profiling tool to identify the HTTP message as the NAT message. Accordingly, when the network traffic profiling tool observes such an HTTP message during traffic analysis, the network traffic profiling tool extracts useful information for demultiplexing and attributing traffic associated with the NAT device. In one or more embodiments, the extracted information includes an identifier and a host device identifying rule of the NAT device (Step 202). The NAT message may be encrypted by a private key of the NAT device that allows the network traffic profiling tool to decode and extract the host device identifying rule of the NAT device.

In Step 203, a flow is captured from the network traffic based on the IP address of the NAT device. In one or more embodiments, a collection of packets is captured using a packet capturing device where a portion of the captured packets share a common source IP address which is the IP address of the NAT device. These captured packets are identified as a flow from the NAT device. For example, the IP address of the NAT device may correspond to a previously captured NAT message and the host device identification rule contained therein.

In Step 204, a data item is extracted from the flow by the network profiling tool according to the host device identification rule. In particular, the data item was previously inserted into the flow by the NAT device consistent with the host device identification rule. Specifically, the extracted data item contains host device identifying information. In one or more embodiments, in addition to specify where/how the host device identifying information is inserted in the flow, the host device identification rule further specifies how the host device identifying information may be used to identify the host device that originated the flow from behind the NAT device. Accordingly, the host device that originated the flow is determined based on the extracted data item according to the host device identification rule (Step 205). Additional details of extracting and using the host device identification information to identify the flow originating host device according to the host device identification rule are described in reference to FIGS. 3.2-3.4 below.

FIG. 3.2 shows additional details of the network node A (112) configured as an example NAT device (320) depicted in FIG. 3.1 above. As shown in FIG. 3.2, the network node A (112) receives access requests (321a) and data packets (322a) from host devices (e.g., host A (115a), host B (115b), etc. of FIG. 3.1) behind the NAT device, referred to as a LAN (local area network) side of the network node A (112). In response, the network node A (112) outputs signaling messages (321b) and masqueraded data packets (322b) to a WAN (wide area network) side of the network node A (112), such as the network nodes (117), link (116), Internet, etc. of FIG. 3.1. Further as shown in FIG. 3.2, the network node A (112) includes hardware and software components that are organized into a management plane (321), a data plane (322), a NAT rule table (323), and a user info DB (324). The NAT rule table (323) and the user info DB (324) stores information used by the NAT device (320) and is referred to as an NAT profile, which is an example of the NAT profile (131) shown in FIG. 1 above. The management plane (321) authenticates host device users and coordinates with a network traffic profiling tool (e.g., network traffic profiling tool (120) of FIG. 1) to monitor network traffic flowing through the link (116) depicted in FIG. 3.1 above.

For example, the host device user authentication may be performed in response to access requests (321a) by the 802.11i module (321a) based on IEEE 802.11i standard for wireless connection on the LAN side. Subsequently, user information is extracted by the captive portal module (321b). In addition, a DHCP handshake is made with the DHCP server (321c) in order to assign the authenticated user's host device a private IP address for the LAN side. When the connection is fully established, the user info database (324) is updated to record that a host device user, who is using a host device (e.g., host A (115a), host B (115b), etc. of FIG. 3.1) behind the NAT device, has been granted to access Internet on the WAN side through the NAT device (i.e., network node A (112)). In the meantime, the NAT rule table (323) is updated as for the network node A (112) to correctly translate the IP addresses for data packets (322a) and masqueraded data packets (322b) with respect to the newly connected host device. The NAT profile information in the user info database (324) and the NAT rule table (323), or an updated portion thereof, is organized by the NAT messenger module (321f) into one of the NAT messages (321b) for sending to the WAN side of the NAT device (320). As noted above, the NAT profile information in the user info database (324) and the NAT rule table (323) includes the identifier and host device identification rule of the NAT device (320).

The captive portal (321c) extracts various types of identity information of the host device and the user, such as user credentials and MAC address of the host device. When the data link between the NAT device (i.e., network node A (112) and a host device (e.g., host A (115a), host B (115b), etc. of FIG. 3.1) is first established via the wireless connection, the host device user is prompted to perform a login. For example, the captive portal (321c) may be an application integrated with popular online social network (OSN) services allowing the host device user to login using OSN credentials. The captive portal (321c) is able to extract the host device user's identity from user profiles of multiple OSN services.

Separate from the activity performed by the management plane (321), the data plane (322) masquerades data packets (322a) originated from one or more host devices (e.g., host A (115a), host B (115b), etc. of FIG. 3.1) behind the NAT device (320) into the masqueraded data packets (322b) according to the rules stored in the NAT rule table (323). These rules are defined by the management plane (321) to specify how the NAPT module (322a) translates the IP address/port number according to certain patterns, or how the information injector module (322b) injects information into the data packets (322a).

Because the NAT device (320) modifies the source port of outgoing data packets (322a) differently to indicate they are from different host devices, the NAT device (320) pre-allocates the source port space into multiple ranges. Every time a new host device connects to the NAT device (320), a unused port range is assigned to the newly connected host device. Subsequently, the NAT device (320) consistently modifies the source port number of outgoing flows from this newly connected host device to a port number within the port range assigned to this newly connected host device. For instance, a port range [1024; 2048) may be assigned to the host A (115a) and a different port range [2048; 3073) may be assigned to the host B (115b) shown in FIG. 3.1 above. In response, the source port in a flow from the host A (115a) is consistently changed to a port number within [1024; 2048) by the NAT device (320). Similarly, the source port in a different flow from the host B (115b) is consistently changed to a port number within [2048; 3073) by the NAT device (320). For a commonly used transport protocols such as TCP or UDP, the available source port space may be pre-allocated into a large number of port ranges for hundreds of different host devices behind the NAT device (320).

FIG. 3.3 shows an example NAT message (330), which is an HTTP POST message sent by the NAT device to the domain "www.google.com" upon successfully authenticating a user after a host device of the user connects to the NAT device. An example NAT message capturing rule used by the network traffic profiling tool may associate a pre-determined string "FF-NAT0.9" with an IP address that identifies a particular NAT device. Specifically, FIG. 3.3 shows the NAT message (330) with the User-Agent string (331) containing the string "FF-NAT0.9" that identifies the NAT device to the network traffic profiling tool. In addition, the NAT message (330) includes the host device identification rule (332) that specifies different source port ranges to indicate distinct host devices behind the NAT device. The example host device identification rule (332) indicates that source port range [1024; 2048) is assigned to the user "Amedeo Sapio" and includes additional identity information of the user. Although the host device identification rule (332) shown in FIG. 3.3 only includes information associated with one host device, the host device identification rule (332) may be expanded to include additional information associated with multiple host devices. As noted above, the User-Agent string (331) identifying the NAT device and the host device identification rule (332) of the identified NAT device are collectively referred to as the NAT profile of the NAT device.

In the example shown in FIG. 3.3, the NAT message (330) is captured by a network traffic profiling tool (e.g., network traffic profiling tool (120) of FIG. 1) to extract and analyze the embedded NAT profile to determine that the NAT device uses port number rage to distinguish different host devices behind the NAT device. Specifically, the network traffic profiling tool analyzes the host device identification rule (332) in the NAT profile to determine a port range assigned to each host device by the NAT device. Accordingly, the network traffic profiling tool compares the port number in each monitored/captured data packet and the port range [1024; 2048) assigned to the user "Amedeo Sapio" to determine one or more matching data packet as belonging to a flow generated by the host device of the user "Amedeo Sapio".

Although the host device identification rule (332) shown in FIG. 3.2 is based on port number ranges allocated for distinct host devices, other variations of the host device identification rule (332) may also be used that insert host device identification information in header fields of the captured flow. Examples of additional variations of the host device identification rule are described in reference to FIG. 3.4 below.

FIG. 3.4 shows additional examples of the host device identification rule that specifies injecting certain additional information into the outgoing data packets (322a) depicted in FIG. 3.2 above. As shown in FIG. 3.2, the information injector (322d) injects information into the packet headers of the data packets (322a) without modifying the packet payloads. Specifically, FIG. 3.4 shows an IP option field (341) in a IP packet header and a TCP option field (342) in a TCP packet header. The IP option field (341) or the TCP option field (342) may be up to 40 bytes where one byte is used to indicate option type, another byte is used to indicate the option length, and the remaining 38 bytes may be used to represent the host device identifier. In particular, the exact length of the IP option field (341) or the TCP option field (342), as well as the option type are specified by the host device identification rule. In an example, the host device identification rule may also specify that the host device identifier is embedded in each data packets in a flow. In another example, the host device identification rule may also specify that the host device identifier is embedded in particular data packets (e.g., the SYN packet, a $n^{th}$ packet where n is a pre-determined integer, etc.) in a flow.

In addition to the IP packet header and the TCP option field (342) described above, the Differentiated Services Code Point (DSCP) field in the IP header may also be used to represent host device identifiers as specified by yet another variation of the host device identification rule. For example, the DSCP field has 6-bits, which may identify up to 64 different host devices behind the NAT device.

Returning to the discussion of FIG. 3.2, in addition to using the port range allocation to identify host devices behind the NAT device (320), the host device identification rule depicted in FIG. 3.4 may also be used that is based on inserting host device identification information into the packet headers. Specifically, when each host device is connected to the NAT device (320) for the first time, all its network traffic is intercepted by the captive portal (321d) in order to authenticate the host device user through the login phase, which may be completed using a login service exposed by an OSN. When the OSN has authenticated the host device user, the NAT device (320) retrieves, using the OSN APIs, all the public profile information of the host device user on the OSN. The NAT device (320) then grants the host device user to access the Internet, executing the data packet masquerading using the NAPT module (322c), and injecting the user identifier (UID) of the newly connected host device into a pre-determined packet (e.g., the first packet or the SYN packet) of each new flow originated from the newly connected host device. Although all of the masqueraded data packets (322b) flowing out of the NAT device (320) have the same source IP address (i.e., the public IP address of the NAT device (320)), the flows coming from different host devices behind the NAT device (320) are differentiated based on different UIDs contained in the first packet of each new flow.

The NAT device (320) coordinates with the network traffic profiling tool (120) shown in FIG. 1 by sending to a widely available web service (e.g. google.com) a self defined ad-hoc HTTP message (as one of the NAT messages (321b)) containing the UID of a particular host device in a specific HTTP header, and further containing, in the HTTP message payload, the profile information retrieved from the OSN used by a user of the particular host device. The HTTP message may include information regarding a single user or aggregate information regarding multiple users. This message has a special User-Agent string to allow the network traffic profiling tool (120), although separate from the active listening service of google.com, to capture the ad-hoc HTTP message and extract the inserted NAT profile data.

Whether the host device identification rule specifies to insert host device identifier in the option field defined in the IP header or TCP header, or in the DSCP field of the IP header, the network traffic profiling tool (120) analyzes the NAT profile inserted in the captured ad-hoc HTTP message to extract the NAT device identification information along with associated host device identification rule. Based on the NAT device identification information, the network traffic profiling tool (120) obtains a flow associated with the identified NAT device. Based on the associated host device identification rule, the network traffic profiling tool (120) determines where to extract the inserted host device identifier from the flow to correctly attribute the flow to a host device behind the NAT device. Accordingly, additional flows attributed to the same host device are associated with a full profile of the host device user retrieved from the OSN used in the login phase.

Figure 4:
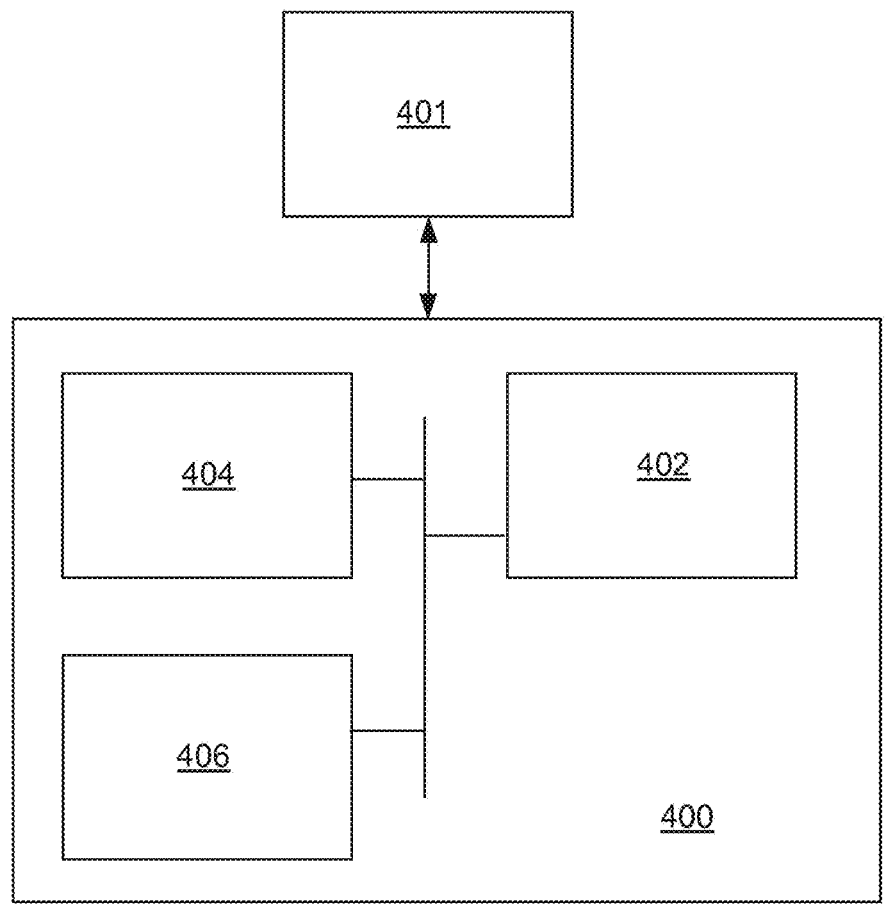
FIG. 4 shows a computing system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic, comprising:
capturing, from the network traffic using a packet capturing device, a plurality of packets, the packet capturing device configured to collect network data for providing to a network traffic profiling tool, the network traffic profiling tool being separate from the packet capturing device;
identifying a first portion of the captured plurality of packets as a first flow based at least on a common Internet Protocol (IP) address assigned to each packet of the first flow by a network address translation (NAT) device, the first flow including an NAT message sent from the NAT device to a predetermined host device coupled to the NAT device, wherein the NAT message is also captured by the packet capturing device;
extracting, by a hardware processor included in the network traffic profiling tool separate from the NAT device, a first data item from the captured NAT message, wherein the first data item is inserted into the captured NAT message by the NAT device for identifying a first host device coupled to the NAT device; and
determining, by the hardware processor based on the first data item, that the first flow is generated by the first host device.

2. The method of claim 1, further comprising:
identifying a second portion of the plurality of packets as a second flow based at least on the common IP address further assigned to each packet of the second flow by the NAT device;
extracting, by the hardware processor, a second data item from the second flow, wherein the second data item is inserted into the second flow by the NAT device for identifying a second host device coupled to the NAT device; and
determining, by the hardware processor based on the second data item, that the second flow is generated by the second host device,
wherein the first data item and the second data item are extracted based on an NAT profile of the NAT device.

3. The method of claim 2, further comprising:
analyzing the NAT profile to determine that the first data item comprises a port number assigned by the NAT device to the first flow;

further analyzing the NAT profile to determine a port range assigned to the first host device by the NAT device; and comparing, by the hardware processor, the port number and the port range to determine a match, wherein determining that the first flow is generated by the first host device is based at least on the match.

4. The method of claim 2, further comprising:

analyzing the NAT profile to determine that the first data item comprises an identifier of the first flow that is embedded by the NAT device in a header field of at least one packet of the first flow;

wherein extracting the first data item comprised extracting the identifier from the header field, and wherein determining that the first flow is generated by the first host device is based at least on the identifier.

5. The method of claim 4, wherein the header field comprises at least one selected from at least one of an IP option field and a Transmission Control Protocol (TCP) option field.

6. The method of claim 2, further comprising:

capturing an NAT message sent from the NAT device to a pre-determined network device, wherein the pre-determined network device is separate from the hardware processor, wherein the NAT profile is embedded in the NAT message by the NAT device; and extracting, in response to capturing the NAT message, the NAT profile from the NAT message.

7. The method of claim 6, wherein the first portion of the plurality of packets is captured from a link coupling a first computer network and a second computer network, wherein the first computer network comprises the NAT device and the first host device, wherein the second computer network comprises the pre-determined network device and a third host device, wherein the first flow is exchanged between the first host device and the third host device, wherein the NAT message sent from the NAT device to the pre-determined network device is captured by the hardware processor from the link, and wherein the NAT profile is extracted by the hardware processor from the captured NAT message.

8. A system for profiling network traffic, comprising:

a network address translation (NAT) device configured to translate Internet Protocol (IP) addresses and port numbers for host devices coupled to the NAT device;

a first host device and a second host device coupled to the NAT device;

a packet capturing device configured to collect network data;

a network traffic profiling tool, the network traffic profiling tool being separate from the packet capturing device and separate from the NAT device, the network traffic profiling tool including a hardware processor; and memory comprising instructions executable by the processor of the network traffic profiling tool, wherein the instructions comprise:

an acquisition module configured to:

obtain a plurality of packets captured by the packet capturing device from the network traffic; and identify a first portion of the captured plurality of packets as a first flow based at least on a common IP address assigned to each packet of the first flow by the NAT device, the first flow including an NAT message sent from the NAT device to a predetermined host device coupled to the NAT device, wherein the NAT message is also captured by the packet capturing device; and a host analyzer configured to:

extract a first data item from the captured NAT message, wherein the first data item is inserted into the captured NAT message by the NAT device for identifying a first host device coupled to the NAT device; and determine, based on the first data item, that the first flow is generated by the first host device.

9. The system of claim 8, host analyzer further configured to:

identify a second portion of the plurality of packets as a second flow based at least on the common IP address further assigned to each packet of the second flow by the NAT device;

extract a second data item from the second flow, wherein the second data item is inserted into the second flow by the NAT device for identifying a second host device coupled to the NAT device; and determine, based on the second data item, that the second flow is generated by the second host device, wherein the first data item and the second data item are extracted based on an NAT profile of the NAT device.

10. The system of claim 9; the host analyzer further configured to:

analyze the NAT profile to determine that the first data item comprises a port number assigned by the NAT device to the first flow;

further analyze the NAT profile to determine a port range assigned to the first host device by the NAT device; and compare the port number and the port range to determine a match, wherein determining that the first flow is generated by the first host device is based at least on the match.

11. The system of claim 9; the host analyzer further configured to:

analyze the NAT profile to determine that the first data item comprises an identifier of the first flow that is embedded by the NAT device in a header field of at least one packet of the first flow;

wherein extracting the first data item comprised extracting the identifier from the header field, and wherein determining that the first flow is generated by the first host device is based at least on the identifier.

12. The system of claim 11, wherein the header field comprises at least one selected from at least one of an IP option field and a Transmission Control Protocol (TCP) option field.

13. The system of claim 9, further comprising an NAT message analyzer configured to:

capture an NAT message sent from the NAT device to a pre-determined network device, wherein the pre-determined network device is separate from the hardware processor, wherein the NAT profile is embedded in the NAT message by the NAT device; and extract, in response to capturing the NAT message, the NAT profile from the NAT message.

14. The system of claim 13, wherein the first portion of the plurality of packets is captured from a link coupling a first computer network and a second computer network, wherein the first computer network comprises the NAT device and the first host device, wherein the second computer network comprises the pre-determined network device and a third host device, wherein the first flow is exchanged between the first host device and the third host device, wherein the NAT message sent from the NAT device to the pre-determined network device is captured by the hardware processor from the link, and wherein the NAT profile is extracted by the hardware processor from the captured NAT message.

15. A non-transitory computer readable medium embodying instructions for profiling network traffic, the instructions when executed by a processor comprising functionality for:

capturing, from the network traffic using a packet capturing device, a plurality of packets, the packet capturing device configured to collect network data for providing to a network traffic profiling tool, the network traffic profiling tool being separate from the packet capturing device;

identifying a first portion of the captured plurality of packets as a first flow based at least on a common Internet Protocol (IP) address assigned to each packet of the first flow by a network address translation (NAT) device, the first flow including an NAT message sent from the NAT device to a predetermined host device coupled to the NAT device, wherein the NAT message is also captured by the packet capturing device;

extracting, by a hardware processor included in the network traffic profiling tool separate from the NAT device, a first data item from the captured NAT message, wherein the first data item is inserted into the captured NAT message by the NAT device for identifying a first host device coupled to the NAT device; and determining, by the hardware processor based on the first data item, that the first flow is generated by the first host device.

16. The non-transitory computer readable medium of claim 15, the instructions when executed by the processor further comprising functionality for:

identifying a second portion of the plurality of packets as a second flow based at least on the common IP address further assigned to each packet of the second flow by the NAT device;

extracting a second data item from the second flow, wherein the second data item is inserted into the second flow by the NAT device for identifying a second host device coupled to the NAT device; and determining, based on the second data item, that the second flow is generated by the second host device, wherein the first data item and the second data item are extracted based on an NAT profile of the NAT device.

17. The non-transitory computer readable medium of claim 16; the instructions when executed by a processor comprising functionality for:

analyzing the NAT profile to determine that the first data item comprises a port number assigned by the NAT device to the first flow;

further analyzing the NAT profile to determine a port range assigned to the first host device by the NAT device; and comparing the port number and the port range to determine a match, wherein determining that the first flow is generated by the first host device is based at least on the match.

18. The non-transitory computer readable medium of claim 16, the instructions when executed by a processor comprising functionality for:

analyzing the NAT profile to determine that the first data item comprises an identifier of the first flow that is embedded by the NAT device in a header field of at least one packet of the first flow;

wherein extracting the first data item comprised extracting the identifier from the header field, and wherein determining that the first flow is generated by the first host device is based at least on the identifier.

19. The non-transitory computer readable medium of claim 18, wherein the header field comprises at least one selected from at least one of an IP option field and a Transmission Control Protocol (TCP) option field.

20. The non-transitory computer readable medium of claim 16, the instructions when executed by a processor comprising functionality for:

capturing an NAT message sent from the NAT device to a pre-determined network device, wherein the pre-determined network device is separate from the hardware processor, wherein the NAT profile is embedded in the NAT message by the NAT device; and extracting, in response to capturing the NAT message, the NAT profile from the captured NAT message.

* * * * *